March 26, 1957  H. W. TAYLOR  2,786,966
THYRATRON CONTROL CIRCUIT
Filed July 17, 1953
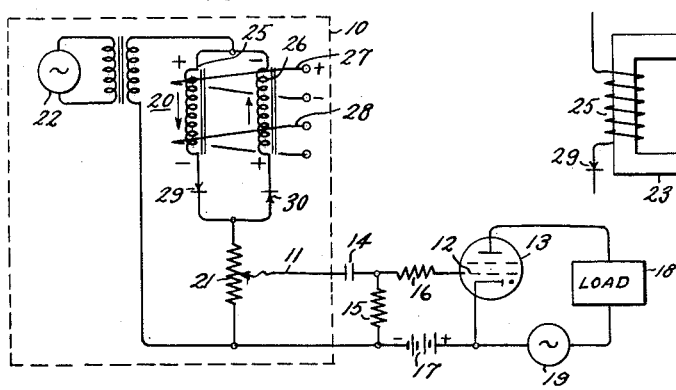
Fig. 1.
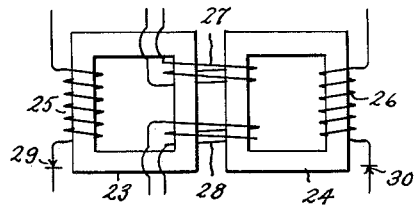
Fig. 1a.
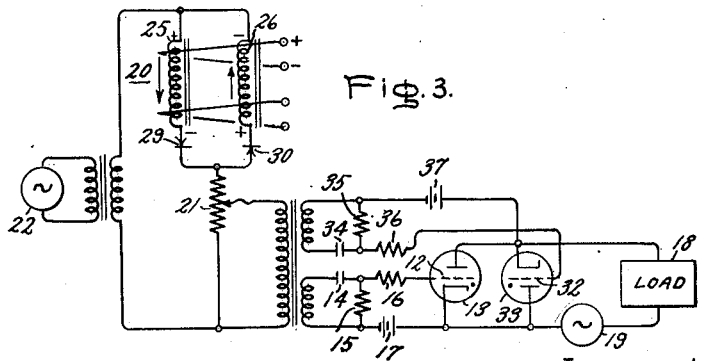
Fig. 2.
Fig. 3.
Inventor:
Herbert W. Taylor,
by Richard E. Hosley
His Attorney.

United States Patent Office 2,786,966
Patented Mar. 26, 1957

2,786,966

THYRATRON CONTROL CIRCUIT

Herbert W. Taylor, Schenectady, N. Y., assignor to General Electric Company, a corporation of New York Application July 17, 1953, Serial No. 368,761

9 Claims. (Cl. 315—163)

This invention generally relates to excitation devices for electron tubes, and more particularly to electrical circuits for precisely controlling the conduction time of gas filled electron tubes.

Current conduction through gas filled electron tubes, like high vacuum electron tubes, may be initially controlled by a suitably energized control grid. However, unlike vacuum tubes, once current flow is established through a gas filled tube the control grid may not normally extinguish the tube. Accordingly, in circuits employing gas filled tubes wherein both an "on" and "off" control of the tube is desired, the control grid is generally energized at the proper time to initially establish conduction through the tube or "fire" the tube, and thereafter alternative means associated with the tube plate-cathode circuit are employed to extinguish this conducting condition.

One common alternative manner heretofore employed for controlling the extinguishment of gas filled electron tubes has been to energize the tube plate-cathode circuit with an alternating current power source. Then, inasmuch as the tube may only pass unidirectional current from plate to cathode, or on alternative positive half cycles of the alternating current, the tube is automatically extinguished at the end of each positive half cycle. Having the extinguishment of the tube automatically controlled, the amount of current passed through the tube, or the time the tube is conducting during these alternative positive half cycles of the source has then been controlled by energizing the control grid to fire the tube at any pre-selected instant during each of these positive half cycles. The sooner the tube is fired by the energized grid during each positive half cycle, the longer the tube conducts until the end of that positive half cycle, and the greater the current flow through the tube.

Inasmuch as the control grid voltage required to fire a gas filled tube is approximately zero with respect to the cathode and varies only slightly in accordance with the voltage applied to the tube plate, one previous manner of varying the time of control grid energization during positive half cycles of the plate voltage has been to apply a similar alternating current to the control grid through a time phase shifting device. By thus controlling the phase of the grid voltage with respect to the plate voltage, the grid may be positively energized at any time during each half cycle as determined by the phase shifter and the tube accordingly fired at this instant. Other methods known to the art for controlling the time of firing have been to energize the tube control grid with positive voltage pulses whose time of occurrence with respect to positive half cycles of tube plate voltage may be varied; however, inasmuch as the latter pulses are also varied in time to control the tube conduction they too may be classified broadly as phase shifters.

Many types of phase shifters suitable for these purposes are known to the art, including vacuum tube wave shaping and shifting circuits, electrical circuit networks employing standardized resistors, capacitors, and inductors; and self-saturating transformers provided with auxiliary saturating windings. The vacuum tube circuits enable precise phase shifting over wide ranges in response to small control signals. However, for applications wherein the circuits are subjected to vibration and shock, the vacuum tubes, being adversely affected thereby render these phase shifters unsatisfactory. The electrical circuit networks similarly provide wide range phase shifts, but in their simplest form change of phase is effected by mechanical variation in the value of one or more of the circuit elements thereby prohibiting remote control of phase shift except by additionally employing position servos or other relatively complex and costly equipment to affect this mechanical variation remotely. Finally, the phase shifters of the type generating pulses which may be varied in time in accordance with a control signal, such as the self-saturating transformers provided with auxiliary saturating windings wherein the phase of the output pulses is varied by varying the value of a direct current flowing through the auxiliary saturating winding, generally require appreciable power through the saturating winding to affect saturation. Therefore, in applications wherein only small control signals are available for actuating the phase shifter, these latter devices are generally unsatisfactory without additional means for amplifying these small control signals.

In a copending application of Robert W. Kuenning, entitled Thyratron Control Circuit, Serial No. 368,709, filed July 17, 1953, and assigned to the same assignee as the present invention, a pulse type time phase shifter is disclosed which may precisely control the firing point of a gas filled electron tube over a wide range. However, unlike the saturating transformer pulse phase shifters, known in the prior art and discussed above, this wide range time phase shifter operates in response to relatively small control signals, thereby eliminating the need for additional amplification in applications wherein only low power signals are available.

The present invention is directed toward providing a time phase shifter generally of this latter type and constituting a modification thereof, which is operable to precisely generate time phase shifted pulses over a wide range in response to relatively small control signals. In accordance with one embodiment of the present invention, this phase shifter comprises a voltage divider circuit employing two parallel connected self-saturable reactors and rectifiers in series with a resistor and an alternating current source. The alternating current source being synchronized with a similar source energizing the gas tube plate-cathode circuit or other discharged device operable to control current to a load. At a predetermined time during each half cycle of the voltage divider energized source, one of these parallel connected reactors self-saturates, thereby varying its impedance from a relatively high value to a low value and enabling most of the alternating current voltage to appear across the series connected resistor as an elongated pulse having a steep wave front. Connecting this resistor across the control grid of the gas filled tube or other phase sensitive device, thereby enables a control to be effected by these time phase shifted pulses. By means of a relatively small control signal jointly energizing auxiliary windings of the parallel connected reactors, the instant at which the reactors alternately saturate during each half cycle of the alternating current source may be precisely controlled, and the time phase occurrence of these bidirectional pulses similarly controlled. Inasmuch as the reactors are principally saturated by the alternating current source and not the control signal, it is apparent that small control signals may effect large changes of phase; and, therefore, the instant invention possesses the advantages of ruggedness and reliability supplied by the prior peaking transformer phase shifters, and the wide range of phase shift with small control signals supplied by the prior vacuum tube circuit phase shifters, while possessing none of the above discussed disadvantages of these devices.

It is, therefore, one object of this invention to provide an excitation device for controlling the conduction time of gas filled electron tubes which is substantially unaffected by shock and vibration.

A further object is to provide an excitation device for controlling the conduction time of gas filled electron tubes.

A further object is to provide an excitation device for controlling the conduction time of gas filled electron tubes over a wide range with low power control signals.

A further object is to provide a simple and inexpensive excitation device for controlling the conduction time of gas filled electron tubes.

A further object is to provide a phase shifter remotely operable to phase shift an alternating current voltage over a wide range in response to small variations of a control signal.

Other objects and many attendant advantages and features will be more readily comprehended by those versed in this art during the course of the following detailed description, taken in connection with the accompanying drawings forming a part of this specification in which:

Fig. 1 is an electrical schematic diagram illustrating an excitation circuit in accordance with the present invention electrically connected to fire a gas filled electron tube, Fig. 1A is a wiring diagram of reactor 20 of Fig. 1, Fig. 2 is a wave form diagram illustrating the operation of the excitation circuit of Fig. 1; and Fig. 3 is a schematic diagram of an alternative gas tube circuit employing the excitation circuit of Fig. 1.

Referring now to Fig. 1 for a detailed consideration of one embodiment of the present invention, a voltage from across a potential divider circuit enclosed within a dotted line generally designated 10 is applied over line 11 to energize the control grid 12 of a gas filled tube 13 through a conventional coupling and biasing circuit comprising a coupling capacitor 14, grid leak resistor 15, grid limiting resistor 16, and direct current biasing source 17. Gas tube 13 having its plate-cathode circuit connected in series with a suitable load 18 is energized by an alternating current source 19 and therefore, as is well-known, may only conduct current during the positive half cycles of current generated by this source and is extinguished near the start of the negative going half cycles of this source. However, as is also well-known in the art, the initial conduction through a gas tube may also be controlled by the potential existing between the tube control grid and cathode, and therefore, in view of the fixed bias 17 existing between this control grid 12 and cathode, a sufficiently large positive signal must be received from the potential divider circuit 10 to overcome this bias before conduction may be established through the tube during said positive half cycles of power source 19.

Potential divider circuit 10 includes a suitable self-saturating type reactor 20 in series with a resistor or potentiometer 21 across an alternating current source 22 which is in time phase relation with the gas tube power source 19; and, inasmuch as the signal energizing the gas tube control grid 12 is derived from the movable tap of potentiometer 21, the amplitude of the signal is determined by the ratio of the impedance presented by reactor 20 to that of potentiometer 21.

As illustrated by Fig. 1A, reactor 20 is preferably comprised of two separate rectangular type saturable iron cores 23 and 24 arranged to provide two closed magnetic paths, and having an alternating current coil 25 embrace the outer leg of one of said cores 23, a second alternating current coil 26 embrace the outer leg of the second of said cores 24, and two additional coils termed a signal coil 27 and a bias coil 28 wound to jointly embrace the inner legs of both cores. Inserted in each of the alternating current coil circuits to enable only a unidirectional current to pass therethrough are rectifiers or diodes 29 and 30; diode 29 being connected in series with alternating current coil 25, and diode 30 being oppositely connected in series with alternating current coil 26. To then enable opposite half cycles of the alternating current source to energize alternative ones of said two magnetic paths, the two alternating current coils 25 and 26 with their associated diodes 29 and 30 are electrically connected in parallel; and this parallel circuit then performing as a single impedance is placed in series with potentiometer 21 to form the voltage divider 10.

For an understanding of the operation of this potential divider circuit in providing pulses synchronized to occur during posiitve half cycles of the gas tube source 19 but variable in time within these half cycles to control the conduction time of the tube, let it be initially assumed that energization of signal coil 27 in accordance with the polarity indicated in Fig. 1 assists in the saturation of the two magnetic cores 23 and 24 provided by the unidirectional current flow through alternating current coils 25 and 26 as indicated by the arrowed lines in Fig. 1; and energization of signal coil 27 in the opposite direction opposes such saturation. Initially, an independent bias current flowing through bias coil 28 is adjusted to a proper value for enabling the alternating current flow through coil 25 to saturate core 23 late in each positive half cycle of the alternating current source. If core 23 is in unsaturated condition, the impedance of reactor 20 is high with respect to potentiometer 21, and therefore most of the alternating current voltage drop from the source appears across the reactor with a negligible voltage reaching control grid 12 of gas tube 13. However, if core 23 is saturated, the reactor impedance drops to a low value with respect to potentiometer 21, and correspondingly, the large voltage drop then appearing across potentiometer 21 is conveyed to the tube control grid 12 to fire the tube. Thus, late in each positive half cycle of the alternating current source, the self-saturation of core 23 provides a pulse across potentiometer 21 to fire gas tube 13; which thereupon remains conducting until the end of that half cycle until extinguished by the supply voltage 19 going negative. Now, for advancing the time during each positive half cycle when core 23 saturates and, therefore, advancing the instant of firing the gas tube, the signal coil 27 is provided; and energizing this coil with a current of proper polarity to aid the alternating current coil saturation of core 23, it is readily comprehended that core 23 will be saturated at an earlier time during the positive half cycle. Conversely, should total cutoff of the gas tube be desired or less current passed therethrough than would normally flow with no signal current, the firing of the gas tube may be delayed by energizing signal coil 27 with reversed polarity current in opposition to the alternating current saturation provided by current flow through coil 25. Thus, in effect, a phase shifter is provided for advancing or delaying the firing point of a gas tube over a wide range by the application of small control signals.

For a graphic illustration of this operation, reference is now made to Fig. 2 illustrating the voltage wave forms generated by voltage divider 10 over line 11 and applied to the gas tube control grid for three conditions of phase shift. Upper curve A illustrating the sinusoidal waveform of the alternating current source, is employed as a time base. Waveform B, C, and D consecutively below A illustrate the voltage occurring across potentiometer 21 as reactor 20 is saturated at various times; curve B, being the normal gas tube firing time as reactor 20 self-saturates at time $T_1$ with no current energizing signal coil 27, curve C comprising an advanced saturation time $T_2$ as an aiding current is directed through signal coil 27, and curve D comprising a retarded saturation time T₃ as an opposing current is directed through signal coil 27. Thus the firing point of the gas tube advances and the current delivered to the load increases with a small increase of saturating current to the reactor, and the firing point of the gas tube is delayed and the current delivered to the load decreases with a reversed polarity saturating current to the reactor.

It is to be noted, however, that the current through bias coil 28 may be initially adjusted to prevent self-saturation of core 23 by the source current passing through the main alternating current coil 25, in which event the tube firing point may be advanced to full "on" or delayed to full "off" by merely varying the magnitude of saturating current through signal coil 27 without changing the polarity thereof.

Inasmuch as reactor 20 employs two separate magnetic cores 23 and 24 symmetrically connected in parallel with the alternating current source, it is apparent that core 24 also self-saturates in response to the source current passing through coil 26 reaching a given amplitude. However, inasmuch as the diodes 29 and 30 are oppositely connected, only the negative going half cycles of the source voltage can direct current through coil 26 whereby core 24 self-saturates only during consecutive negative going half cycles of the source. Thus reactor 20 may provide phase shifted pulses during both positive and negative half cycles of the source, as illustrated by curves B, C, and D of Fig. 2, and these negative going phase shifted pulses may be employed to fire a second gas tube as shown in Fig. 3. Referring to Fig. 3 for a more detailed consideration thereof, an additional gas filled tube 33 is placed in parallel with tube 13 and oppositely in circuit with the load and alternating current source to conduct for negative going half cycles of the power supply in response to the potential divider generated negative pulses, and be extinguished by positive going half cycles of the power supply. Inasmuch as this circuit is substantially identical with the circuit of Fig. 1, with the addition of a second gas filled tube 33 and its associated control grid network of coupling capacitor 34, grid leak resistor 35, current limiting resistor 36, and fixed bias source 37; the operation of the second gas tube 33 is the same as that of the first tube 13. However, being oppositely connected, each tube conducts on alternative half cycles of the source. Thus, during each half cycle of the alternating current source one tube is extinguished while the other is conducting, thereby providing full wave control of current to load 18.

It is to be particularly noted that although the circuits of Figs. 1 and 3 are illustrated as employing direct current signal energy through signal coil 27 for effecting earlier or later saturation of reactor 20 with the attendant time variation in firing point of the gas tube, it is contemplated that phase shift of the tube firing point may be effected by an alternating current control signal energizing coil 27. This latter modification is simply made by reversing the circuit connections of either main winding 25 or 26, and additionally substituting an alternating current bias source (not shown) for the direct current bias sources (17 of Fig. 1, or both 17 and 37 of Fig. 3). Furthermore, any number of these circuits, just as the vacuum tube phase shifters and circuit network phase shifters they replace, may be employed in polyphase applications i. e. two phase, three phase, and so forth, if desired.

Inasmuch as these variations and many others may be readily made by those skilled in the art in accordance with the basic invention, this invention is to be considered as limited only in accordance with the basic features thereof as set forth in the claims appended hereto.

What I claim as new and desire to secure by Letters Patent of the United States is:

1. A bidirectional pulse phase shifter comprising; a potential divider adapted to be energized by a bidirectional, varying current source, said divider including an impedance and a parallel connected pair of self-saturable reactors in series connection therewith, each of said reactors having a large impedance value when unsaturated and a small impedance value when saturated, and being self-switchable from one value to the other upon the source current passing therethrough exceeding a given amplitude, rectifying means in circuit with each reactor and being oppositely poled to divert substantially all source current of one polarity to one reactor and substantially all source current of opposite polarity to the other reactor, at least one control coil magnetically associated with both reactors and adapted to be energized by a control signal to vary the degree of saturation of both reactors, whereby the self-saturation of the reactors in response to a given amplitude of source current enables the generation of bidirectional voltage pulses from across the impedance, and the amplitude and sense of applied signals to the control coil determines the time phase occurrence of said pulses.

2. A bidirectional pulse phase shifter comprising; a potential divider adapted to be energized by a bidirectional, periodically recurring, varying current source, said divider including a resistor and a parallel connected pair of impedances in series therewith, each of said parallel connected impedances having two substantially constant values and being self-switchable from one value to the other in response to source current passing therethrough exceeding a given amplitude, first means associated with said parallel connected impedances for diverting substantially all the source current of one polarity through one of said impedances and diverting substantially all the source current of opposite polarity through the other of said impedances, and control means associated with both impedances for jointly varying the sensitivity of each to current passing therethrough and enabling different source current magnitudes to effect said switching function, whereby said switching function enables the generation of bidirectional voltage pulses from across said resistor, and said control means determines the time phase occurrence of said pulses.

3. A bidirectional pulse phase shifter comprising; a potential divider adapted to be energized by a bidirectional, varying current source, said divider including an impedance in series with a plurality of parallel connected circuits, each said circuit including a self-saturable reactor in series with a unidirectional conducting device, at least one control coil magnetically associated with all said reactors and adapted to be energized by a control signal to jointly vary the saturation of said reactors, whereby the self-saturation of the reactors in response to a given amplitude of source current enables the generation of voltage pulses from across said impedance, and the amplitude in sense of applied signals to said control coil determines the time phase occurrence of said pulses.

4. In an excitation device for energizing the control electrodes of a plurality of gas filled electron tubes to alternately fire said tubes during consecutive half cycles of an alternating current source, a potential divider adapted to be energized by said source, said divider including an impedance in series with a plurality of parallel connected circuits, each said circuit including a self-saturable reactor in series with a unidirectional conducting device, means for energizing the control electrodes of said tubes in accordance with the potential existing across said impedance, and means for jointly varying the degree of saturation of said reactors.

5. In an excitation device for energizing a control electrode of a gas filled tube to repetitively fire said tube at any preselected instant during like polarity half cycles of an alternating current source, a potential divider adapted to be energized by said source and including a unidirectional conducting device in series with first and second impedances, a second unidirectional conducting device in series with a third impedance in parallel circuit with said first unidirectional conducting device and said first impedance, said second impedance having a constant value and said first and third impedances having two substantially constant values; and being operable to switch from one value to the other upon the source current passing therethrough exceeding a given magnitude, adjustable means jointly associated with and controlling said first and third impedances for determining the source current necessary for switching the same, and means for enegizing said control electrode with the voltage existing across said second impedance, whereby the voltage appearing across said second impedance is abruptly varied from a lower to a higher value at a variable instant during consecutive cycles of the source as determined by said adjustable means and said higher value voltage is conducted to fire said tube.

6. In a pulse phase shifter, a potential divider adapted to be energized by a recurrently varying current source, said divider including an impedance in series with a plurality of parallel connected circuits, each said circuit including a self-saturable reactor in series with a unidirectional conducting device, said unidirectional conducting devices being connected to divert source current of one polarity through one circuit and source current of opposite polarity through another circuit, at least one control coil magnetically associated with all said self-saturable reactors and adapted to be energized by a control signal to vary the degree of saturation of said reactors, a phase sensitive load, and means for connecting said load in parallel with said impedance, whereby self-saturation of the reactors in response to a given amplitude of source current enables the generation of voltage pulses from across said impedance, and the amplitude and sense of applied signals to the control coil determines the time phase occurrence of said pulses.

7. In a device for controlling power to a load, a potential divider adapted to be energized by an alternating current source, said divider including an impedance in series with a plurality of parallel connected circuits, each circuit including a self-saturable reactor in series with a rectifier, a first control coil magnetically associated with all said reactors for varying their response to current passing therethrough a gaseous discharge tube having an anode, cathode and control electrode, means for enabling the energization of said tube plate cathode circuit by said alternating current source, and means connecting said tube control electrode cathode-circuit in parallel with said impedance.

8. In a time phase shifting circuit for controlling the conduction time of two parallel connected, alternating current energized, gas filled electron tubes having conduction controlling electrodes, to thereby control the full wave direct current energy to a load, a potential divider adapted to be energized by an alternating current source, said divider including an impedance in series with a plurality of parallel connected circuits, each said circuit including switchable impedances in series with a unidirectional conducting device, said switchable impedances having two substantially constant values and being operable to switch from one value to the other upon the source current passing therethrough exceeding a given magnitude, said unidirectional conducting devices being arranged to enable source current of one polarity to flow through one said circuit and source current of the opposite polarity to flow through another said circuit, adjustable means associated with said switchable impedances for determining the source current magnitude necessary for switching the same, and means for energizing each of the conduction controlling electrodes of the gas tubes in accordance with the potential existing across said impedance.

9. In a device for controlling power to a load, a polarity responsive voltage divider adapted to be energized by an alternating current source, said divider including an impedance and a pair of circuits, each circuit including a self-saturable reactor, means for electrically connecting one of said circuits in series with said impedance for enabling the passing of source current of one polarity therethrough and the other of said circuits in series with said impedance for enabling the passage of source current of the opposite polarity therethrough, and means for jointly varying the degree of saturation of both reactors; a plurality of parallel connected switches connectible in series circuit with a load and power source, each of said switches having a phase sensitive control means, and means for energizing each of said control means in accordance with the voltage across said impedance.

References Cited in the file of this patent
UNITED STATES PATENTS

| | | |
|---|---|---|
| 2,093,883 | Elder | Sept. 21, 1937 |
| 2,157,812 | Bedford | May 9, 1939 |
| 2,471,826 | Lord | May 31, 1949 |
| 2,473,237 | Bivens | June 14, 1949 |